(12) United States Patent
Harrison et al.

(10) Patent No.: US 10,519,958 B2
(45) Date of Patent: Dec. 31, 2019

(54) SYSTEMS AND METHODS TO PROVIDE LUBRICANT TO A BEARING

(71) Applicant: TRANE INTERNATIONAL INC., Davidson, NC (US)

(72) Inventors: Mark W. Harrison, Onalaska, WI (US); Jon C. Johnson, New Albin, IA (US); Todd W. Smith, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 294 days.

(21) Appl. No.: 15/522,879

(22) PCT Filed: Oct. 30, 2015

(86) PCT No.: PCT/US2015/058310
§ 371 (c)(1),
(2) Date: Apr. 28, 2017

(87) PCT Pub. No.: WO2016/070043
PCT Pub. Date: May 6, 2016

(65) Prior Publication Data
US 2018/0274544 A1    Sep. 27, 2018

Related U.S. Application Data

(60) Provisional application No. 62/073,485, filed on Oct. 31, 2014.

(51) Int. Cl.
*F04D 17/12* (2006.01)
*F04D 25/06* (2006.01)
(Continued)

(52) U.S. Cl.
CPC ............. *F04D 17/12* (2013.01); *F04D 25/06* (2013.01); *F04D 29/057* (2013.01); *F04D 29/063* (2013.01); *F16C 33/1045* (2013.01)

(58) Field of Classification Search
CPC ........ F04D 17/12; F04D 25/06; F04D 29/057; F04D 29/063; F16C 33/1045; F16N 25/00; F16N 7/32
See application file for complete search history.

(56) References Cited

U.S. PATENT DOCUMENTS 3,499,503 A    3/1970  Murray et al.
4,140,441 A    2/1979  Patterson
(Continued)

FOREIGN PATENT DOCUMENTS

EP    0228040         7/1987
EP    1267081 A2     12/2002
(Continued)

OTHER PUBLICATIONS

Extended European Search Report, European Patent Application No. 15854877.6, dated Dec. 1, 2017 (8 pages).
(Continued)

*Primary Examiner* — Michael R Mansen
*Assistant Examiner* — Robert T Reese
(74) *Attorney, Agent, or Firm* — Hamre, Schumann, Mueller & Larson, P.C.

(57) ABSTRACT

Systems and methods to help provide lubricant to a bearing in a compressor are disclosed. The embodiments disclosed herein generally are directed to systems and methods to provide a lubricant flow to the bearing, where the lubricant flow relies on the rotation of a shaft of the compressor, so that the lubricant flow can be independent of a power supply.

9 Claims, 5 Drawing Sheets

(51) Int. Cl.
*F04D 29/057* (2006.01)
*F04D 29/063* (2006.01)
*F16C 33/10* (2006.01)

(56) References Cited

U.S. PATENT DOCUMENTS

| | | | | |
|---|---|---|---|---|
| 4,734,018 | A * | 3/1988 | Taniyama | F04D 29/104 |
| | | | | 277/419 |
| 4,940,341 | A | 7/1990 | Schuetz et al. | |
| 5,051,007 | A | 9/1991 | Maddox et al. | |
| 5,207,291 | A | 5/1993 | Mezzedimi et al. | |
| 6,616,415 | B1 * | 9/2003 | Renken | F04C 28/08 |
| | | | | 318/433 |
| 6,640,933 | B2 * | 11/2003 | Henry | F16C 33/6662 |
| | | | | 184/5.1 |
| 8,567,207 | B2 * | 10/2013 | Sommer | F04D 17/12 |
| | | | | 415/150 |
| 2010/0186439 | A1 * | 7/2010 | Ogata | F04B 39/0207 |
| | | | | 62/402 |
| 2011/0016913 | A1 | 1/2011 | Tsukamoto et al. | |
| 2011/0219809 | A1 * | 9/2011 | Kurihara | F01D 15/005 |
| | | | | 62/468 |
| 2012/0297818 | A1 * | 11/2012 | Toyama | F04B 39/023 |
| | | | | 62/470 |
| 2013/0183146 | A1 * | 7/2013 | Minegishi | F04D 17/12 |
| | | | | 415/177 |
| 2014/0241926 | A1 | 8/2014 | Fraser | |

FOREIGN PATENT DOCUMENTS

| | | |
|---|---|---|
| EP | 1698783 | 9/2006 |
| EP | 2177760 | 4/2010 |
| EP | 2530320 | 5/2012 |
| JP | 2009-215931 A | 9/2009 |
| JP | 2011-185175 A | 9/2011 |

OTHER PUBLICATIONS

European Examination Report, European Patent Application No. 15854877.6, dated Oct. 1, 2018 (4 pages).
International Search Report and Written Opinion, International Patent Application No. PCT/US2015/058310, dated Feb. 4, 2016 (8 pages).

* cited by examiner

SECTION A-A
FIG. 3C

SYSTEMS AND METHODS TO PROVIDE LUBRICANT TO A BEARING

FIELD

The disclosure herein relates to a compressor, such as for example a centrifugal compressor in a chiller of a heating, ventilation and air conditioning (HVAC) system. More specifically, the disclosure relates to systems and methods to provide lubrication to a bearing.

BACKGROUND

In a compressor, e.g. a centrifugal compressor, one or more impellers may be used to compress a fluid (e.g. gaseous refrigerant). Typically, the one or more impellers are mounted on a shaft, which is driven by a motor. The shaft can be supported by one or more bearings, which can be configured to withstand axial and radial forces in operation. Some bearings require lubrication in operation.

SUMMARY

Embodiments disclosed herein generally are directed to systems and methods to deliver a lubricant flow to a bearing (e.g. a bearing surfaces) in a compressor, where the lubricant flow relies on the rotation of the shaft in the compressor. The embodiments as disclosed herein can help maintain a lubricant flow, for example, when there is a power outage, so that the bearing can be lubricated during a period of time for the shaft to stop in a power outage situation. The compressor can be included, for example, in a chiller of a HVAC system.

In some embodiments, a compressor such as a centrifugal compressor may include a shaft and a lubricant delivery system configured to deliver lubricant to the shaft of the compressor. In some embodiments, the lubricant delivery system may include a lubricant sump, where an end of the shaft is positioned in a sump volume of the lubricant sump. The compressor may include a bearing that is configured to support the shaft. In some embodiments, the shaft may have a first opening at the end of the shaft and a second opening that provides a bearing access, and the first opening and the second openings may be in fluid communication with a lubricant delivery channel. The lubricant delivery channel can direct lubricant from the lubricant sump to the bearing access, where the lubricant can be taken up by the bearing for lubrication. In some embodiments, the centrifugal compressor may also include a shroud that is configured to cover the end of the shaft. In some embodiments, the shroud is positioned in the sump volume of the lubricant sump.

In some embodiments, the lubricant delivery system may include a lubricant pump that is configured to take in a lubricant from the lubricant sump when the centrifugal compressor is in operation and the lubricant pump is configured to deliver the lubricant into the lubricant delivery channel.

In some embodiments, the lubricant pump may be configured to rotate along with the shaft. The rotation of the lubricant pump may help deliver the lubricant from the lubricant sump to the lubricant delivery channel. In some embodiments, the lubricant pump may be a centrifugal lubricant pump.

In some embodiments, the lubricant pump may be positioned at the end of the shaft. In some embodiments, the lubricant pump may have a lubricant inlet positioned in the sump volume of the lubricant sump. In some embodiments, the lubricant inlet is positioned outside of the shroud.

In some embodiments, the lubricant sump may have an overflow opening and a lubricant drainage opening. The overflow opening may be located at an upper portion of the lubricant sump and the oil drainage opening may be located at a lower portion of the lubricant sump.

Other features and aspects of the systems, methods, and control concepts will become apparent by consideration of the following detailed description and accompanying drawings.

BRIEF DESCRIPTION OF THE DRAWINGS

Reference is now made to the drawings in which like reference numbers represent corresponding parts throughout.

FIGS. 2A-2D illustrate one embodiment of a motor of an exemplary centrifugal compressor including a lubricant delivery system, according to one embodiment.

FIGS. 3A-C illustrate one embodiment of a lubricant sump of the motor of the compressor.

DETAILED DESCRIPTION

A compressor can be used in various applications to compress a fluid, such as for example to compress a refrigerant gas in a chiller of a HVAC system. In the example of a centrifugal compressor, one or more impellers can be arranged in series on a shaft. The refrigerant gas is compressed by a centrifugal force of the impeller(s).

The shaft of the compressor may be supported by one or more bearings, which can be configured to withstand axial forces and/or radial forces in operation. Some bearings require lubrication in operation. Lack of lubrication during operation can result in an elevated operation temperature such as by friction, wear and tear of the bearings, causing early termination of their service lives, malfunction or failure. In some cases (such as for example in a hydrodynamic bearing, lack of lubricant can cause a wiped bearing, where a portion of the bearing surface may melt and the melted material may move for example to an edge of the bearing where the material may be re-solidified.

In one specific example, one or more hydrodynamic bearings can be used to support the shaft in the compressor. A hydrodynamic bearing typically relies on a layer of lubricant to separate two bearing surfaces during operation. If lubricant is not sufficiently delivered between the bearing surfaces, the two bearing surfaces can contact directly during operation, which can cause detrimental effect (e.g. an elevated operation temperature, wear and tear, a wiped bearing) on the bearing surfaces.

A compressor can have a lubricant delivery system to provide lubricant to the bearing(s). The lubricant delivery system can include a lubricant pump. But in some operation conditions, such as for example during power outage, the lubricant pump may not function properly. In such a condition, the bearing(s) can lose lubricant quickly. However, there may be still a relatively long period of time before the shaft comes to a stop. The period of the time for the shaft to come to a stop may depend on, for example, a mass of the shaft and the impeller(s) mounted on the shaft, and a pressure differential between a suction side and a discharge side of the compressor. In some compressors using a relatively high pressure refrigerant (e.g. R-245a, R-1233zd), the period of time for the shaft to stop can be relatively long due to e.g. a relatively high pressure differential between the suction side and the discharge side of the compressor. In some circumstances, the pressure differential can push the shaft to rotate in an opposite direction relative to its normal operation.

The lubricant on the bearing(s) may become insufficient to provide appropriate lubrication to the bearings during such a period of time for the shaft to stop. In addition, the bearing(s) may still carry a thrust load due to the pressure differential. These factors can cause damage to the bearing(s). In some cases, when for example a hydrodynamic bearing is used, lack of sufficient lubricant can cause the two bearing surfaces to contact and rub against each other. In some situations, the bearing surfaces may even be melted due to friction, and the melted material of the bearing surfaces may re-solidify at for example an edge of the bearing surface, causing a melted bearing.

Embodiments as disclosed herein are directed to systems and methods to help provide lubricant to a bearing in a compressor. The embodiments disclosed herein generally are directed to systems and methods to provide a lubricant flow to the bearing (e.g. a bearing access) that relies on the rotation of a shaft of the compressor, so that the lubricant flow can be independent of a power supply. The embodiments as disclosed herein can help reduce wear and tear and the occurrence of a wiped bearing, and increase the reliability of the bearing.

References are made to the accompanying drawings that form a part hereof, and in which is shown by way of illustration of the embodiments in which the embodiments may be practiced. It is to be understood that the terms used herein are for the purpose of describing the figures and embodiments and should not be regarded as limiting in scope.

Figure 1:
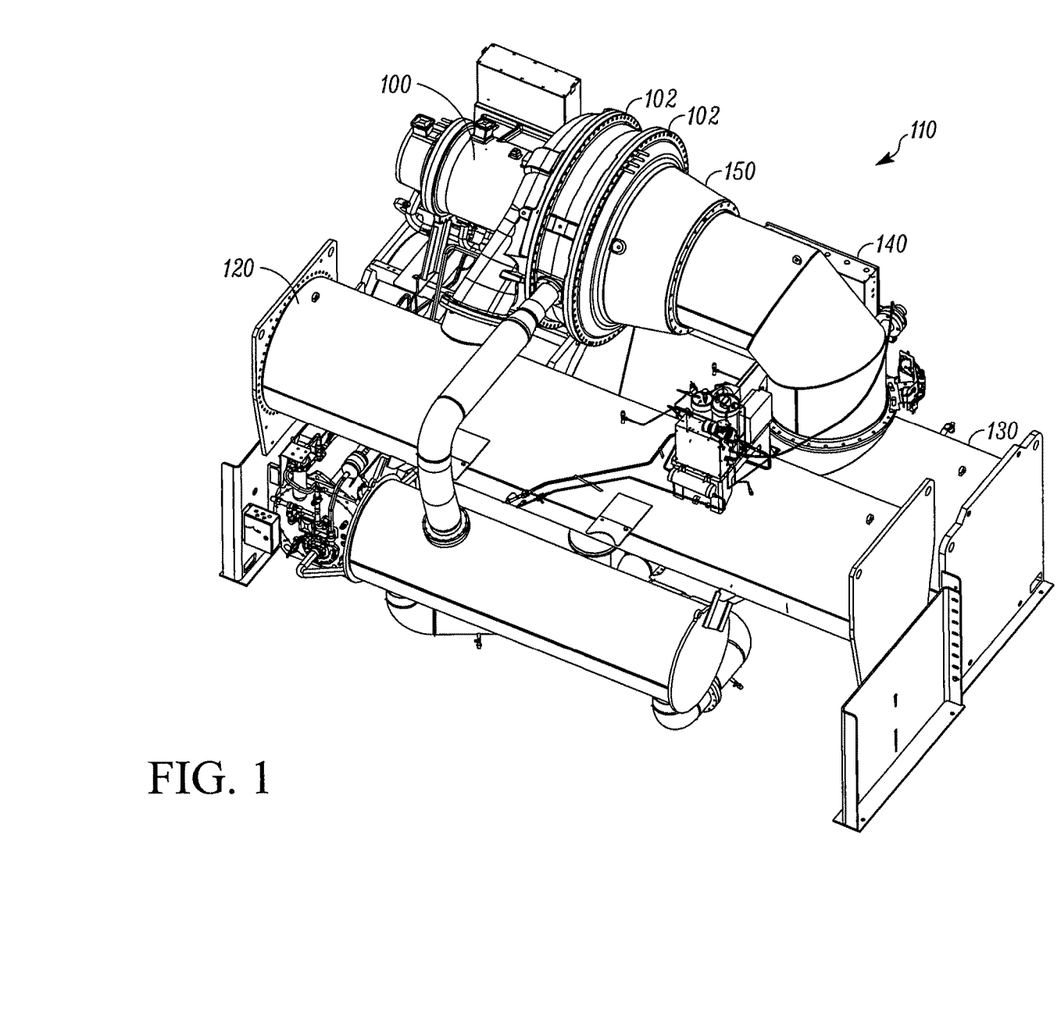
FIG. 1 illustrates one embodiment of a chiller, with which the embodiments as disclosed herein can be practiced.

FIG. 1 illustrates an exemplary multi-stage centrifugal compressor 150, with which the embodiments as disclosed herein can be practiced. It is to be understood that the embodiments as disclosed herein may be used with a single stage centrifugal compressor, other dual-stage centrifugal compressors, three-stage centrifugal compressors, or other suitable single or multi-stage compressors. The embodiments as disclosed herein may also be suitable for other types of compressors that may produce axial/radial thrusts during operation, such as for example a turbo compressor.

The centrifugal compressor 150 includes a motor 100, and is illustrated to work in a chiller 110, which can be part of a HVAC system, with the understanding that a centrifugal compressor may also be used in other systems or applications.

The chiller 110 typically includes a condenser 120 and an evaporator 130 to form a refrigeration circuit together with the compressor 150. The chiller 110 may also include a control system 140 to control the operation of the chiller 110.

Figure 2A:
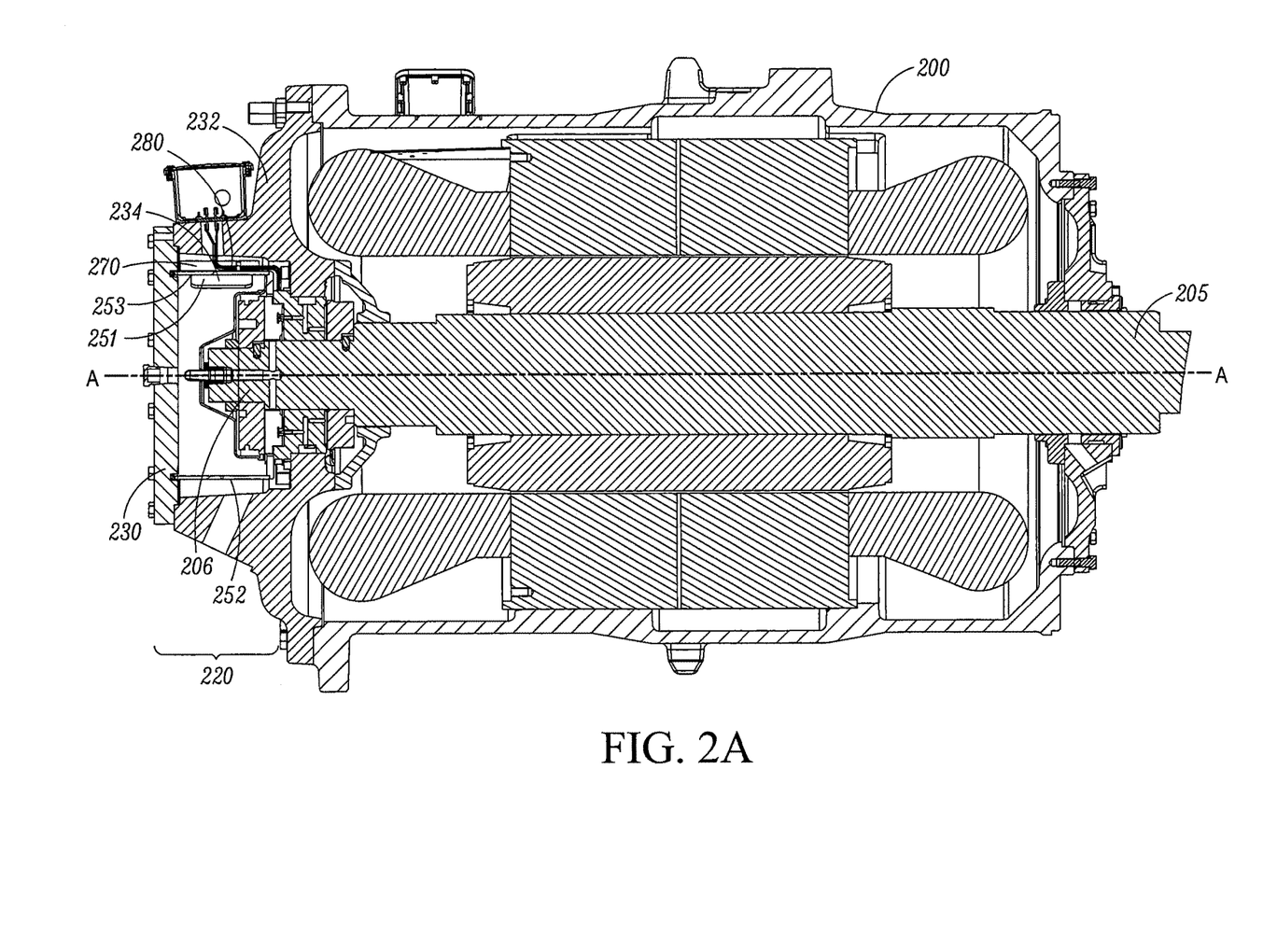
FIG. 2A illustrates a sectional view of the motor including the lubricant delivery system.
Figure 2B:
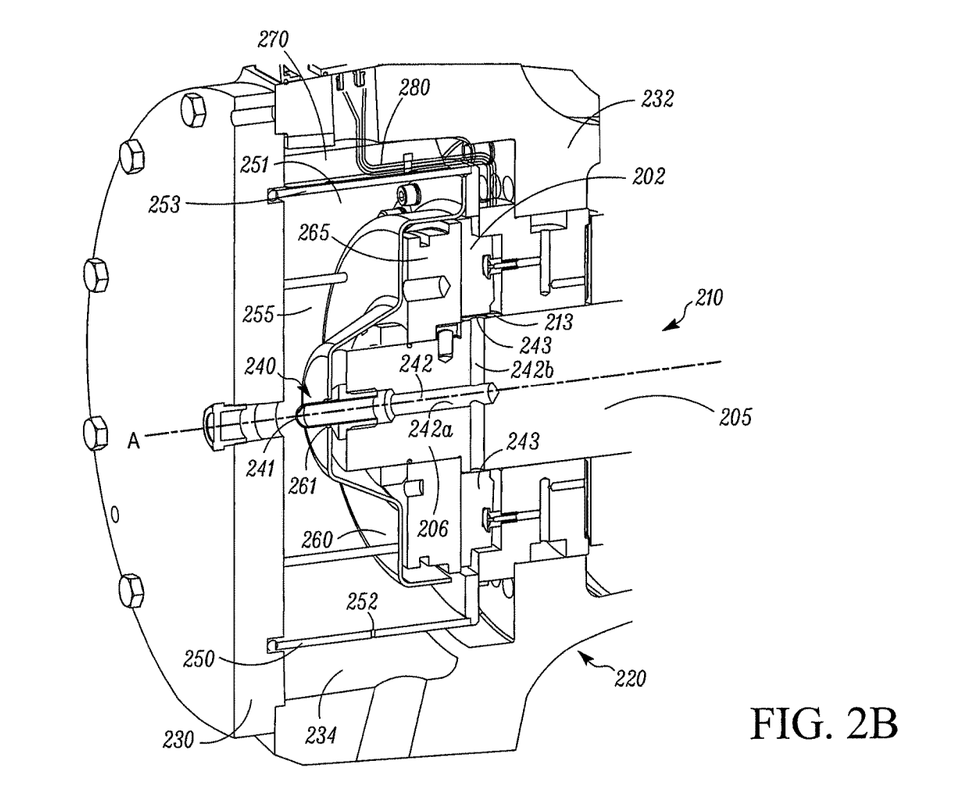
FIG. 2B illustrates an enlarged perspective section view of the motor showing a close up view of the lubricant delivery system.

In the illustrated embodiment, the compressor 150 includes impellers located at 102, which are mounted on a shaft in series (see e.g. shaft 205 in example of FIGS. 2A and 2B). In operation, the impellers 102 compress gaseous refrigerant in a sequential manner, which increases a pressure of the refrigerant during the process. In operation, the shaft may need to be supported by one or more bearings, which may require lubrication.

FIGS. 2A to 2D illustrates one embodiment of a lubricant delivery system 220 that is configured to provide lubricant (e.g. oil) to a bearing 202 that is configured to support the shaft 205.

Referring to FIG. 2A, a motor 200 for a compressor is illustrated. The motor 200 can drive a shaft 205 to rotate, thereby rotating one or more impellers (not shown in FIG. 2A, see e.g. 102 in FIG. 1). An end 206 of the shaft 205 is positioned inside a cavity 234 defined by a bearing housing 232 and a cover 230. The cavity 234 may be configured to contain, for example, the lubricant and/or refrigerant. The lubricant delivery system 220 is located at the end 206 and is inside the bearing housing 232.

Referring to FIGS. 2A and 2B, in an embodiment, a lubricant sump 250 (labeled in FIG. 2B) includes an overflow opening 251 and a drainage opening 252. In an embodiment, the overflow opening includes a rib section 253, which can provide reinforcement of the opening and a support for line(s) 280, e.g. wires, to pass along the top of the lubricant sump 250. In an embodiment, the lines 280 are temperature sensor lines for a bearing part, e.g. 203, which in some embodiments is a bearing pad. In an embodiment, the lubricant sump 250 includes a deflector 270 to protect and/or shield for example lines 280 from overflow fluid that may exit the opening 250, which may be potentially damaging to the lines 280. Details of the deflector 270 are further described with respect to FIGS. 3A-C.

Referring to FIG. 2B, an enlarged view of the lubricant delivery system 220 is illustrated at an end 210 of the motor 200. The end 206 of the shaft 205 can be equipped with a lubricant pump 240 configured to deliver the lubricant to a bearing access 213, wherein the bearing 202 is in contact with the shaft 205. The lubricant can then be delivered to bearing surfaces between the bearing 202 and a thrust collar 265 to provide lubrication (e.g. the bearing surface 207).

Figure 2C:
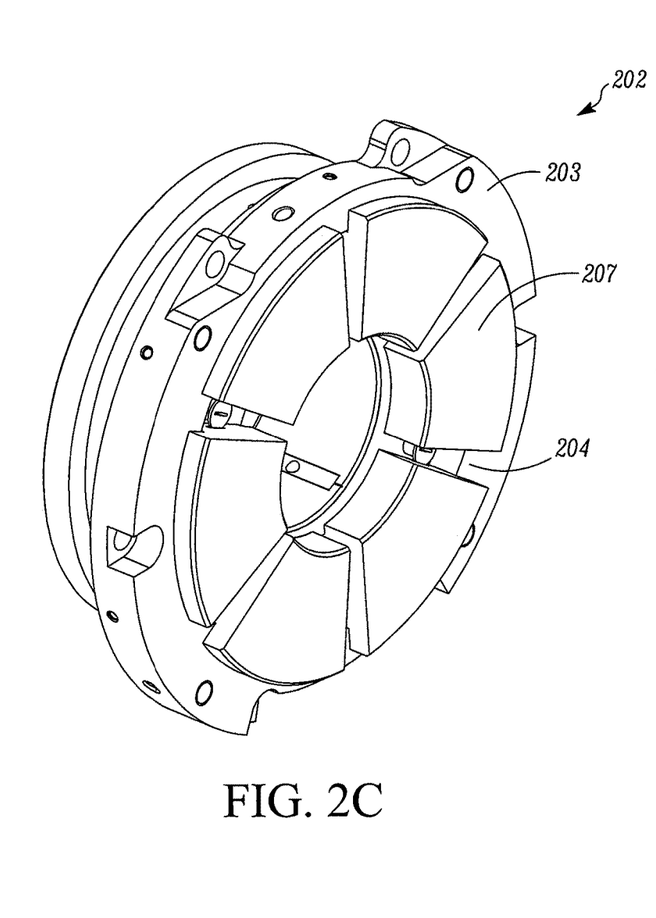
FIG. 2C illustrates a perspective side view of an exemplary thrust bearing part that can be used in the motor of the compressor.

Referring to FIG. 2C, in some embodiments, a thrust bearing part 203, which may be a part of the bearing 202 as illustrated in FIG. 2B, may include one or more bearing channels 204. In operation, lubricant at the bearings access can be delivered to the bearing surfaces 207 through the bearing channels 204.

Figure 2D:
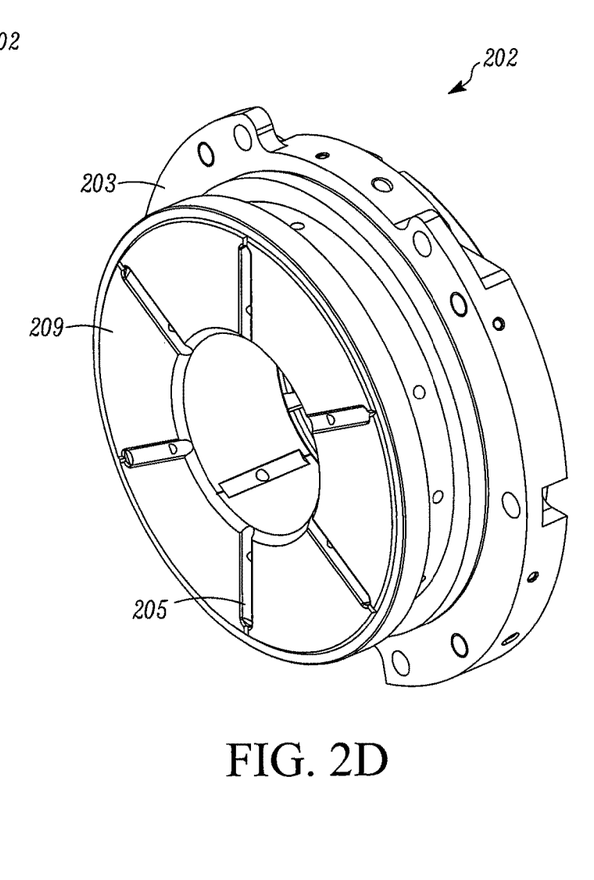
FIG. 2D illustrates another perspective side view of an exemplary thrust bearing part that can be used in the motor of the compressor.

Referring to FIG. 2D, in some embodiments, another side of the thrust bearing part 203 of the bearing 202 as illustrated in FIG. 2B, may include one or more bearing channels 205. In operation, lubricant at the bearings access 213 can be delivered to the bearing surfaces 209 through the bearing channels 205.

In the illustrated embodiment, the lubricant pump may include a centrifugal lubricant pump 240 that is positioned at the end 206 of the shaft 205. The centrifugal lubricant pump 240 includes a lubricant inlet 241, which forms a fluid communication with a lubricant delivery channel 242.

The shaft 205 has an axis A. In the illustrated embodiment, the lubricant inlet 241 is positioned to be centered by the axis A. The lubricant delivery channel 242 includes a first portion 242a that extends for example along the axis A and a second portion(s) 242b that extends outwardly from (e.g. perpendicular to) the axis A. As illustrated, the second portion 242b has one or more openings 243, which lead to the bearing access 203. The second portion 242b of the lubricant delivery channel 242 helps form a fluid communication between the lubricant inlet 241, the first portion 242a, and the bearing access 213. In the illustrated embodiment, the second portion 242b can be a cross-drilled hole for example along a diameter of the shaft 205. The one or more openings 243 form a fluid communication of the bearing 202 with the centrifugal lubricant pump 240, so that lubricant taken up by the centrifugal lubricant pump 240 at the lubricant inlet 241 can be delivered to the one or more openings 243 and be directed to the bearing access 213.

In the illustrated embodiment, a lubricant sump 250 may be positioned in the cavity 234 to define a sump volume 255. The sump volume 255 may be filled with lubricant to a level that is sufficient to allow lubricant to be taken up by the lubricant pump 240 during operation. In some examples, the level may be sufficient to flood the lubricant inlet 241 during operation. The sump 250 and the sump volume 255 in some circumstances provide a lubricant supply to the lubricant pump 240 so as to keep the lubricant inlet 241 flooded during operation. The lubricant sump 250 may include the overflow opening 251 configured to allow lubricant to flow out of the lubricant sump 250. The lubricant sump 250 may also include the drainage opening 252 configured to direct the lubricant out of the sump volume 255. It is noted that in some embodiments, a separate sump (e.g. the lubricant sump 250) may not be necessary as the cavity 234 may serve as the sump, which may be used to contain a sufficient amount of lubricant to be taken up by the lubricant inlet 241.

In the illustrated embodiment, the shaft 205 is horizontally positioned. The overflow opening 251 is positioned at an upper portion of the lubricant sump 250, and the drainage opening 252 is positioned at a lower portion of the lubricant sump 250. The overflow opening 251 and the drainage opening 252 allow the lubricant to circulate through the lubricant sump 250, which can help keep the lubricant warm during operation. In some embodiments, a circulation taking up the lubricant through the sump 250 can be at or about 7 gallon per minute (gpm).

In some embodiments, the end 206 of the shaft can be covered by a shroud 260, as illustrated. The shroud 260 is shaped to generally follow an outer shape of the end 206 so that the shroud 260 can cover the end 206 for example in a relatively close proximity to the end 206 of the shaft 205. The shroud 260 in some examples can also be shaped to cover other components, such as the thrust collar 265, in a relatively close proximity. Generally, the shroud 260 can be shaped to cover components that are in contact with the lubricant directly and that have relative motion with respect to the lubricant inside the lubricant sump 250 during operation. The relative motion of such components (e.g. the end 206 of the shaft 205, the thrust collar 265) with respect to the lubricant may cause lubricant turbulence in the lubricant sump 250 in operation. By covering such components with the shroud 260 in close proximity, e.g. suitably close enough to prevent splashing, the lubricant turbulence in operation can be reduced, resulting in a relatively calm lubricant environment inside the lubricant sump 250.

The shroud 260 includes an aperture 261 that allows the lubricant inlet 241 to extend out of the shroud 260, so that the lubricant inlet 241 can take in lubricant from the sump volume 255.

In operation, the lubricant sump 250 can help keep a sufficient amount of lubricant available to be taken up by the centrifugal lubricant pump 240. The shroud 260 helps provide a relatively calm lubricant environment in operation. The centrifugal lubricant pump 240 can rotate along with the shaft 205. The rotation of the centrifugal lubricant pump 240 helps direct the lubricant from the lubricant inlet 241 into the lubricant delivery channel 242. The lubricant can then be delivered to the bearing access 213 and be directed to lubricate the bearing surfaces (e.g. the bearing surface 207 in FIG. 2C and/or bearing surface 209 in FIG. 2D). Because the function of the centrifugal lubricant pump 240 depends on the rotation of the centrifugal lubricant pump 240 along with the shaft 205, but does not require a power supply, lubricant can still be delivered to the bearing access 213 even during a power outage. Generally, any suitable passive lubricant pump that does not depend on a power supply can be used.

Figures 3A, 3B, 3C:
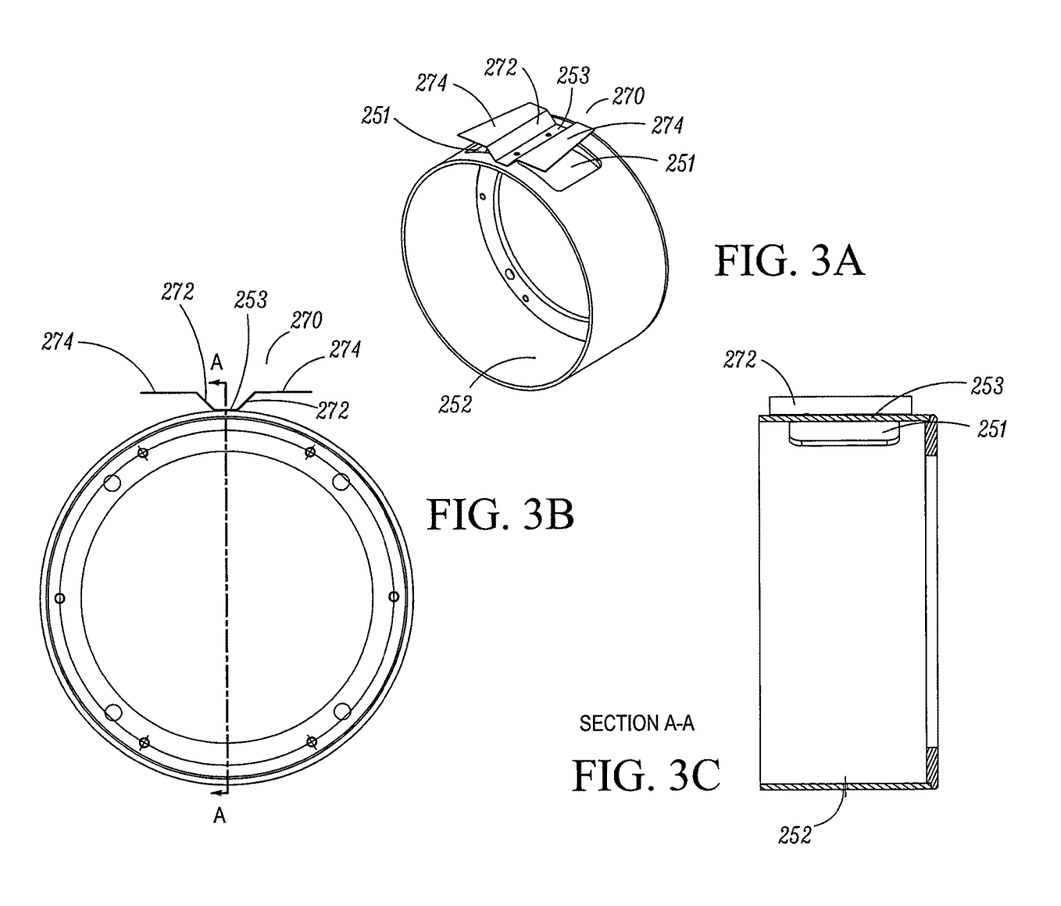
FIG. 3A illustrates a perspective view thereof.
FIG. 3B illustrates an end view thereof.
FIG. 3C illustrates a section view thereof taken from line A-A of FIG. 3B.

Referring to FIGS. 3A-C, further details are shown of an embodiment of the lubricant sump 250 having the deflector 270 and rib 253. FIG. 3A illustrates a perspective view thereof, FIG. 3B illustrates an end view thereof, and FIG. 3C illustrates a section view thereof taken from line A-A of FIG. 3B. The deflector 270 can have connecting portions 272, which in an embodiment connect to the lubricant sump 250 at the rib 253. In an embodiment, extended portions 274 connect to the connecting portions, and extend from the connecting portions 272 and over the opening 251. In an embodiment, the rib 253 also provides a surface on which lines, e.g. lines 280, may pass. The deflector 270 and/or the rib 253 shield and/or protect such lines from fluid, e.g. high velocity fluid(s), that may exit or overflow from opening 251. In an embodiment, the rib 253 can help prevent deformation lubricant sump 250 and/or the opening 251 during operation, such as by increased temperature.

It is to be appreciated that the embodiments as disclosed herein can not only be applied to a compressor, but also to other rotatory machines (e.g. a pump, a turbocharge compressor) having one or more bearings that require lubrication. It is to be appreciated that the illustrated embodiment shows that the shaft 205 is positioned in a horizontal position. This is exemplary, and the embodiments as disclosed herein can also be used when the shaft is in a vertical position.

Aspects

Aspect 1: A centrifugal compressor, comprising:
a shaft;
a lubricant sump, the lubricant sump covering an end of the shaft; and
a bearing configured to support the shaft, the bearing having a bearing access;
wherein the shaft has a first opening at the end of the shaft and a second opening in fluid communication with the bearing access; and the first opening and the second openings are in fluid communication with a lubricant delivery channel.

Aspect 2. The centrifugal compressor of aspect 1, further comprising:
a shroud; wherein the shroud is configured to cover the end of the shaft.

Aspect 3: The centrifugal compressor of aspects 1-2, further comprising:
a lubricant pump; wherein the pump is configured to take in lubricant from the lubricant sump when the centrifugal compressor is in operation and the lubricant pump is configured to deliver the lubricant to the lubricant delivery channel.

Aspect 4: The centrifugal compressor of aspect 3, wherein the lubricant pump is a centrifugal lubricant pump that rotates along with the shaft.

Aspect 5. The centrifugal compressor of aspects 3-4, wherein the lubricant pump is positioned at the end of the shaft.

Aspect 6. The centrifugal compressor of aspects 3-5, wherein the lubricant pump has a lubricant inlet, and the lubricant inlet is positioned outside of the shroud.

Aspect 7. The centrifugal compressor of aspects 1-6, wherein the lubricant sump has an overflow opening and a lubricant drainage opening, the overflow opening is located at an upper portion of the lubricant sump and the oil drainage opening is located at a lower portion of the lubricant sump.

Aspect 8. The centrifugal compressor of aspects 1-7 is included in a chiller.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A centrifugal compressor, comprising:
    a shaft;
    a lubricant sump, the lubricant sump covering an end of the shaft;
    a bearing configured to support the shaft, the bearing having a bearing access; and
    a shroud, located within the lubricant sump and covering the end of the shaft, the shroud having an aperture, the aperture allowing a lubricant inlet to extend out of the shroud, such that the lubricant inlet can take in lubricant from the lubricant sump,
    wherein the shaft has a first opening at the end of the shaft and a second opening in fluid communication with the bearing access; and the first opening and the second opening are in fluid communication with a lubricant delivery channel.

2. The centrifugal compressor of claim 1, further comprising:
    a lubricant pump; wherein the lubricant pump is configured to take in lubricant from the lubricant sump when the shaft of the centrifugal compressor is rotating and the lubricant pump is configured to deliver the lubricant to the lubricant delivery channel.

3. The centrifugal compressor of claim 2, wherein the lubricant pump is a centrifugal lubricant pump that rotates along with the shaft.

4. The centrifugal compressor of claim 2, wherein the lubricant pump is positioned at the end of the shaft.

5. The centrifugal compressor of claim 1, further comprising:
    a lubricant pump; wherein the lubricant pump is configured to take in lubricant from the lubricant sump when the shaft of the centrifugal compressor is rotating and the lubricant pump is configured to deliver the lubricant to the lubricant delivery channel.

6. The centrifugal compressor of claim 1, wherein the lubricant sump has an overflow opening and a lubricant drainage opening, the overflow opening is located at an upper portion of the lubricant sump, and the lubricant drainage opening is located at a lower portion of the lubricant sump.

7. The centrifugal compressor of claim 1, wherein the lubricant sump is constructed by a bearing housing and cover.

8. A chiller comprising a centrifugal compressor of claim 1.

9. A method of lubricating a bearing in a centrifugal compressor, comprising:
    rotating a shaft of the centrifugal compressor;
    rotating a lubricant pump connected to an end of the shaft;
    directing lubricant from a lubricant sump into an inlet of the lubricant pump;
    directing lubricant through a lubricant delivery channel to a bearing access; and
    lubricating a bearing surface with the lubricant that was delivered to the bearing access,
    wherein a shroud covers the end of the shaft,
    the shroud is within the lubricant sump,
    the shroud has an aperture, and
    the aperture allows the inlet of the lubricant pump to extend out of the shroud, such that the lubricant inlet can take in lubricant from the lubricant sump.

* * * * *